(12) United States Patent
Kasahara et al.

(10) Patent No.: US 9,720,767 B2
(45) Date of Patent: Aug. 1, 2017

(54) STORAGE APPARATUS AND STORAGE APPARATUS CONTROL METHOD

(71) Applicant: Hitachi, Ltd., Tokyo (JP)

(72) Inventors: Shinichi Kasahara, Tokyo (JP); Masahiro Ide, Tokyo (JP); Tetsuya Kojima, Tokyo (JP)

(73) Assignee: HITACHI, LTD., Tokyo (JP)

( * ) Notice: Subject to any disclaimer, the term of this patent is extended or adjusted under 35 U.S.C. 154(b) by 49 days.

(21) Appl. No.: 14/758,929

(22) PCT Filed: Jan. 24, 2013

(86) PCT No.: PCT/JP2013/051392
§ 371 (c)(1),
(2) Date: Jul. 1, 2015

(87) PCT Pub. No.: WO2014/115277
PCT Pub. Date: Jul. 31, 2014

(65) Prior Publication Data
US 2015/0339184 A1    Nov. 26, 2015

(51) Int. Cl.
*G06F 11/10* (2006.01)
*G06F 13/00* (2006.01)
(Continued)

(52) U.S. Cl.
CPC .......... *G06F 11/1004* (2013.01); *G06F 11/00* (2013.01); *G06F 11/1096* (2013.01); *G06F 13/00* (2013.01); *G06F 13/28* (2013.01)

(58) Field of Classification Search
CPC .. G06F 11/1004; G06F 11/1096; G06F 11/00; G06F 13/28; G06F 13/00
See application file for complete search history.

(56) References Cited

U.S. PATENT DOCUMENTS 5,867,509 A * 2/1999 Tanaka ................ H03M 13/091
370/473
2005/0278602 A1* 12/2005 Oogami ................ H04L 1/0041
714/752
(Continued)

FOREIGN PATENT DOCUMENTS

JP       09-116541 A    5/1997
JP    2002-185438 A    6/2002
(Continued)

*Primary Examiner* — April Y Blair
*Assistant Examiner* — Rong Tang
(74) *Attorney, Agent, or Firm* — Volpe and Koenig, P.C.

(57) ABSTRACT

A storage apparatus includes a channel control unit, a storage device, and a processor. The channel control unit includes a plurality of operation units. The processor specifies, when receiving a request for read of a plurality of pieces of element data from a host computer, the plurality of pieces of element data to the plurality of operation units, respectively. The plurality of operation units respectively reads the plurality of pieces of element data from the storage device, calculates a plurality of partial codes that is a plurality of guarantee codes on the basis of the plurality of pieces of element data, and transmits the plurality of partial codes to the processor. The processor calculates, on the basis of the plurality of partial codes, a sequence code that is a guarantee code of sequence data including the plurality of pieces of element data which is concatenated.

9 Claims, 8 Drawing Sheets

(51) Int. Cl.
  *G06F 13/28* (2006.01)
  *G06F 11/00* (2006.01)

(56) References Cited

U.S. PATENT DOCUMENTS

| | | |
|---|---|---|
| 2008/0109615 A1 | 5/2008 | Morishita et al. |
| 2008/0215769 A1* | 9/2008 | Nakagoe ............... H04L 1/0052 710/26 |
| 2009/0254721 A1 | 10/2009 | Suzuki et al. |
| 2010/0211703 A1* | 8/2010 | Kasahara ............ G06F 11/1076 710/22 |

FOREIGN PATENT DOCUMENTS

| | | |
|---|---|---|
| JP | 2004-173178 A | 6/2004 |
| JP | 2008-257364 A | 10/2008 |
| JP | 2011-176597 A | 9/2011 |
| WO | 2010/095173 A1 | 8/2010 |
| WO | 2011/105031 A1 | 9/2011 |

* cited by examiner

STORAGE APPARATUS AND STORAGE APPARATUS CONTROL METHOD

TECHNICAL FIELD

The present invention relates to a data guarantee technology in a storage apparatus.

BACKGROUND ART

There has been known a technology of performing, in a communication interface between a storage apparatus and a host computer, generation and check of a guarantee code of data that is to be transferred (PTL 1).

CITATION LIST

Patent Literature

PTL 1

US Patent Application Publication No. 2008/0109615 (Specification)

SUMMARY OF INVENTION

Technical Problem

When cyclic redundancy check (CRC) is used for a guarantee code and an operation is performed using each of a plurality of pieces of data in order to calculate a guarantee code of data including a concatenated plurality of pieces of data, an operation result varies depending on an order of the plurality of pieces of data, and therefore, the guarantee code have to be calculated while the order of the plurality of pieces of data is maintained.

When a single direct memory access (DMA) controller is used for transferring a plurality of pieces of data, the DMA controller calculates a guarantee code of concatenated data. Also, when a plurality of DMA controllers is used for transferring a plurality of pieces of data, one of the DMA controllers performs an operation of a guarantee code of one data, and another of the DMA controllers takes over a result of the operation and performs an operation of a guarantee code of next data. In this case, even when the plurality of DMA controllers is used, the plurality of pieces of data has to be sequentially operated, and thus, it is difficult to improve a data transfer performance.

Solution to Problem

In order to solve the above-described problem, a storage apparatus according to an aspect of the invention includes a channel control unit coupled to a host computer, a storage device coupled to the channel control unit, and a processor coupled to the channel control unit and the storage device. The channel control unit includes a plurality of operation units. The processor specifies, when receiving a request for read of a plurality of pieces of element data from the host computer, the plurality of pieces of element data to the plurality of operation units, respectively. The plurality of operation units respectively reads the plurality of pieces of element data from the storage device, calculates a plurality of partial codes that is a plurality of guarantee codes on the basis of the plurality of pieces of element data, and transmits the plurality of partial codes to the processor. The processor calculates, on the basis of the plurality of partial codes, a sequence code that is a guarantee code of sequence data including the plurality of pieces of element data which is concatenated.

Advantageous Effects of Invention

According to one aspect of the present invention, a plurality of operation units calculates a plurality of guarantee codes, respectively, on the basis of a plurality of pieces of data, and thus, a data transfer performance may be improved.

DESCRIPTION OF EMBODIMENTS

Embodiments of the present invention will be hereinafter described with reference to drawings.

Note that information of the present invention herein will be described below using expressions, such as an "aaa table," an "aaa list," an "aaa DB," and an "aaa cue," and the like. The information may be represented by expressions other than data structures of a table, a list, a DB, a cue, and the like. Therefore, in order to indicate that the information is not dependent on a data structure, there might be cases where each of the "aaa table," the "aaa list," the "aaa DB," and the "aaa cue," and the like is referred to as "aaa information."

Furthermore, when each information content is described, expressions, such as "identification information," an "identifier," a "forename," a "name," and an "ID," are used, but the expressions may be replaced by one another.

The term "program" will be sometimes used hereinafter as a subject, but the term "processer" may be also used as a subject, since a program is executed by a processer to perform defined processing using a memory and a communication port (a communication control device). Also, processing disclosed using a program as a subject may be processing performed by a calculating machine, such as a management server and the like, and an information processing apparatus. Also, a part or all of the program may be executed by dedicated hardware.

Also, each program may be installed in a program distribution server, and a storage apparatus using a calculating-machine-readable storage media.

A storage apparatus according to an embodiment of the present invention will be hereinafter described.

Figure 1:
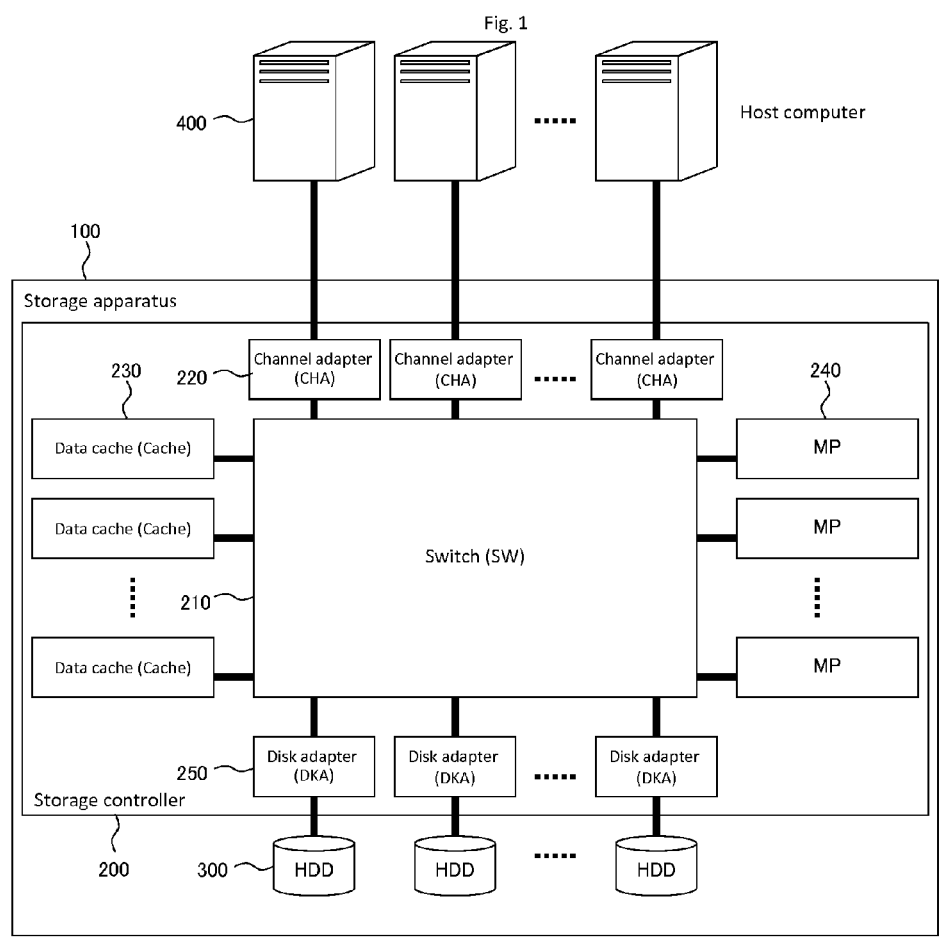
FIG. 1 is a diagram illustrating a configuration of a storage apparatus according to an embodiment of the present invention.

FIG. 1 is a diagram illustrating a storage apparatus according to the embodiment of the present invention. A storage apparatus 100 illustrated in FIG. 1 is coupled to a plurality of host computers 400. The storage apparatus 100 includes a storage controller 200 and a plurality of hard disk drives (HDDs) 300. The storage controller 200 is coupled to the host computers 400 via a storage area network (SAN) and the like. The plurality of HDDs 300 is coupled to the storage controller 200. Note that the storage apparatus 100 may be configured to be coupled to a single host computer 400. Also, the storage apparatus 100 may be configured to include a single HDD 300. Also, instead of the HDDs 300, some other drives, such as solid state drives (SSDs) and the like, may be used.

The storage controller 200 includes a switch (SW) 210, a plurality of channel adapters (CHAs) 220, a plurality of data caches (Caches) 230, a plurality of microprocessors (MPs) 240, and a plurality of disk adapters (DKAs) 250. The storage controller 200 may be configured to include a single data cache 230. The storage controller 200 may be configured to include a single MP 240. The storage controller 200 may be configured to include a single disk adapter 250.

The switch 210 controls communication among the channel adapters 220, the data caches 230, the MPs 240, and the disk adapters 250.

The channel adapters 220 are coupled to the host computers 400 and control communication with the host computers 400.

The data caches 230 store data that is to be transmitted to the host computers 400 and data received from the host computers 400. The data caches 230 further include a shared memory. The shared memory stores a program and data used by the MPs 240.

The MPs 240 control each section of the storage apparatus 100 on the basis of the program and data stored in the shared memory.

The disk adapters 250 are coupled to the HDDs 300 and control communication with the HDDs 300.

Figure 2:
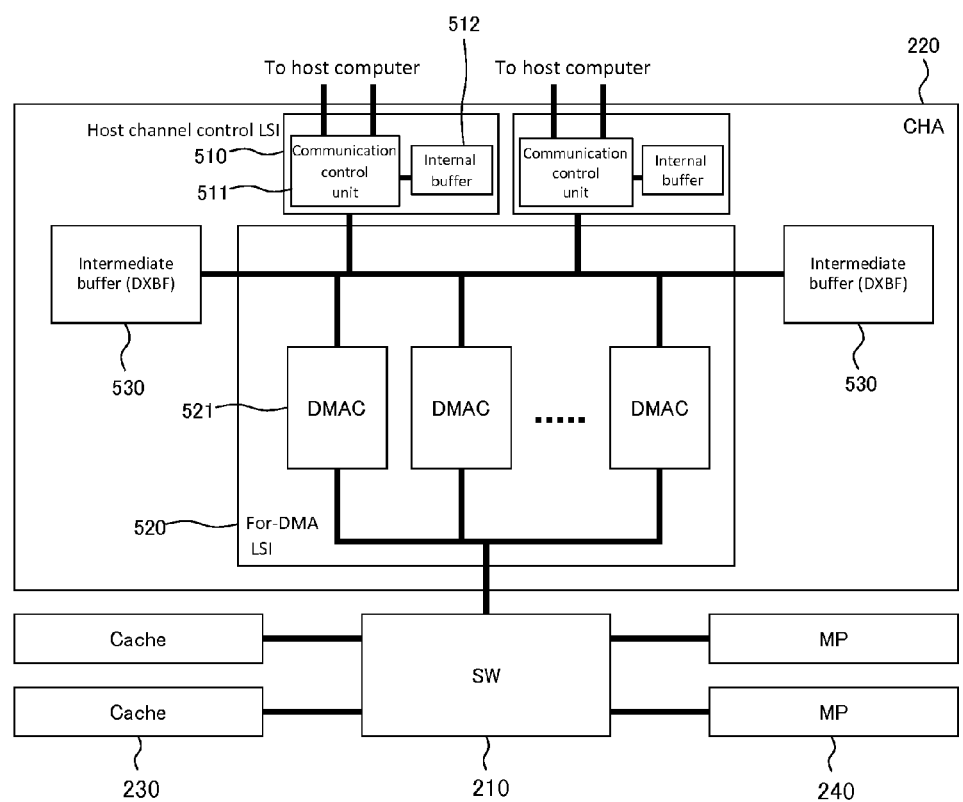
FIG. 2 is a diagram illustrating a configuration of a channel adapter 220.

FIG. 2 is a diagram illustrating a configuration of the channel adapter 220. Each of the channel adapters 220 includes a plurality of host channel control large-scale integrations (LSIs) 510, a for-DMA LSI 520, and a plurality of intermediate buffers (DXBFs) 530. The channel adapter 220 may be configured to include a single host channel control LSI 510. The channel adapter 220 may be configured to include a single intermediate buffer 530.

Each of the host channel control LSIs 510 includes a communication control unit 511 and an internal buffer 512. The communication control unit 511 is coupled to a corresponding one of the host computers 400 and controls communication with the host computer 400 in accordance with a predetermined protocol. In this embodiment, the communication control unit 511 employs fiber connectivity (FICON)-high performance (HPF), but may use some other protocol. The internal buffer 512 stores data that is to be transmitted to the host computer 400.

The intermediate buffers 530 are, for example, dynamic random access memories (DRAMs) and store data transferred from the data caches 230 by the for-DMA LSI 520.

The for-DMA LSI 520 includes a plurality of DMA controllers (DMACs) 521. The DMA controllers 521 may be different DMA circuits and, as another option, may be virtual DMA controllers to which DMA circuits are allocated respectively. Note that one of the DMA circuits in the for-DMA LSI 520 may be logically divided into the plurality of DMA controllers 521. The DMA circuit calculates a guarantee code. The guarantee code in this embodiment is a CRC, and the DMA circuit calculates a 4-byte CRC using a 4-byte initial value and an input having a length of a multiple of 4 bytes. A generator polynomial for the CRC is represented, for example, by 0x04C11DB7. Note that the guarantee code may be some other error detection code, error correction code, or the like.

The DMA controllers 521 read data from the data caches 230 in accordance with the MPs 240, perform a CRC operation on the basis of the read data, and write the read data to the intermediate buffers 530.

The FICON-HPF supports a multi-track read request for concatenating a plurality of tracks together and transferring the concatenated tracks in accordance with a single read request. The term "track" used herein means data having an arbitrary length specified in units of bytes.

Multi-track read processing will be hereinafter described.

The host computer 400 transmits a multi-track read request to the storage apparatus 100, and thus, the storage apparatus 100 performs multi-track read processing. The multi-track read request specifies a plurality of tracks.

Figure 3:
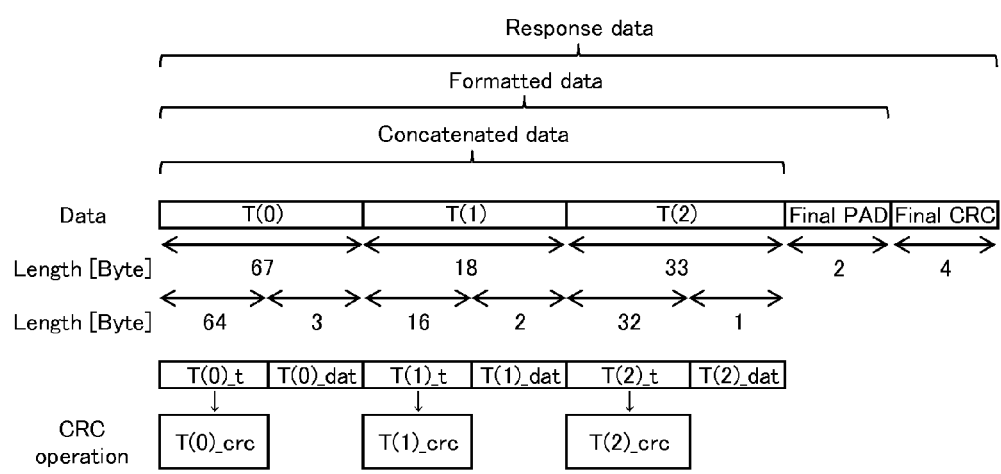
FIG. 3 is diagram illustrating an example of response data to a multi-track read request.

FIG. 3 is diagram illustrating an example of response data to the multi-track read request.

The storage apparatus 100 that has received the multi-track read request transmits, to the host computers 400, response data including concatenated data in which the plurality of tracks is concatenated in a requested order, a final PAD, and a final CRC. Data in which the final PAD is joined after the concatenated data is referred to as formatted data. A length of the formatted data is a multiple of 4 bytes. The final PAD is all-zero data that adjusts the length. The final CRC is a CRC of the formatted data. A length of the final CRC is 4 byte. In this case, the corresponding MP 240 calculates, as a formatted data length, a value that is a smallest one of multiples of 4 bytes which are equal to or larger than a concatenated data length, and calculates, as a final PAD length, a value obtained by subtracting the concatenated data length from the formatted data length. Furthermore, when the final PAD length is not 0, the MP 240 generates the final PAD, that is, all-zero data having the final PAD length.

Figure 4:
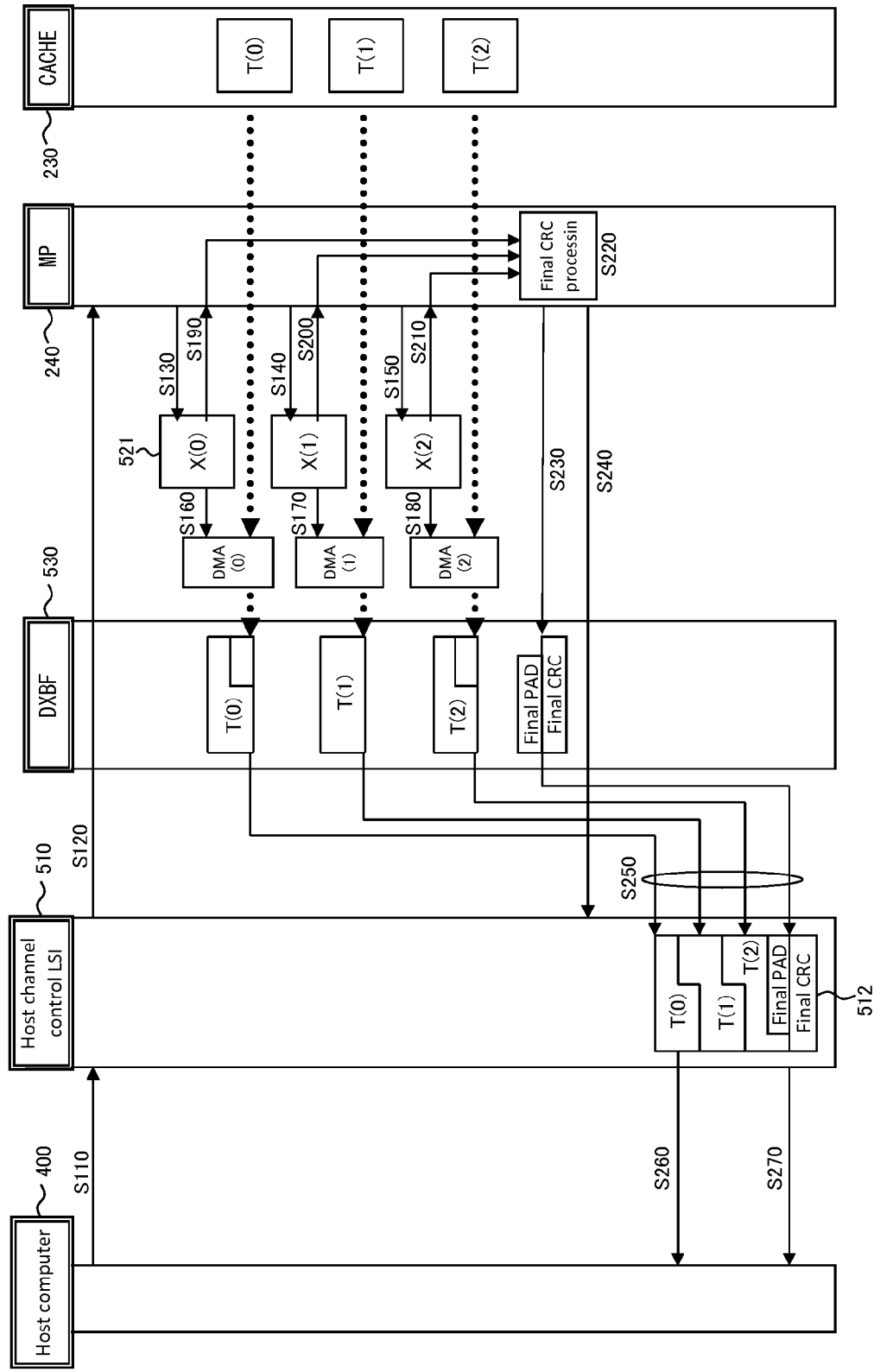
FIG. 4 is a diagram schematically illustrating multi-track read processing.

FIG. 4 is a diagram schematically illustrating the multi-track read processing.

FIG. 4 illustrates a flow of data between the host computer 400, the host channel control LSI 510, the intermediate buffer 530, the plurality of DMA controllers 521, the MP 240, and the data cache 230. In this case, the multi-track read request specifies three tracks, that is, T(0), T(1), and T(2), stored in the storage apparatus 100. Also, the for-DMA LSI 520 includes three DMA controllers 521, that is, X(0), X(1), and X(2). In this case, T(0), T(1), and T(2) indicate a state of being stored in the data cache 230. If it is determined that a cache error has occurred in any one of T(0), T(1), and T(2), the disk adapter 250 reads the track in which it is determined that the cache error has occurred from the HDD 300 and writes read data to the data cache 230.

First, the host computer 400 issues a multi-track read request to the host channel control LSI 510 (S110). The host channel control LSI 510 that has received the multi-track read request transmits the multi-track read request to the MP 240 (S120).

The MP 240 that has received the multi-track read request allocates, on the basis of the multi-track read request, data transfer of T(0) to X(0), data transfer of T(1) to X(1), and data transfer of T(2) to X(2) in order to perform data transfer of a plurality of tracks in parallel. Thereafter, the MP 240 transmits, via channel command word (CCW), a transfer start request specifying T(0) to X(0) (S130), a transfer start request specifying T(1) to X(1) (S140), and a transfer start request specifying T(2) to X(2) (S150).

X(0) that has received the transfer start request starts DMA(0), that is, DMA processing for T(0) (S160). By DMA(0), X(0) reads T(0) in the data cache 230, performs a CRC operation on the basis of T(0), and transfers T(0) to the intermediate buffer 530. X(1) that has received the transfer start request starts DMA(1), that is, DMA processing for T(1) (S170). By DMA(1), X(1) reads T(1) in the data cache 230, performs a CRC operation on the basis of T(1), and transfers T(1) to the intermediate buffer 530. X(2) that has received the transfer start request starts DMA(2), that is, DMA processing for T(2) (S180). By DMA(2), X(2) reads T(2) in the data cache 230, performs a CRC operation on the basis of T(2), and transfers T(2) to the intermediate buffer 530.

When DMA(0) is completed, X(0) transmits a transfer completion report representing a result of DMA(0) to the MP 240 (S190). When DMA(1) is completed, X(1) transmits a transfer completion report representing a result of DMA(1) to the MP 240 (S200). When DMA(2) is completed, X(2) transmits a transfer completion report representing a result of DMA(2) to the MP 240 (S210).

The MP 240 that has received the transfer completion reports transmitted from X(0), X(1), and X(2) performs final CRC processing of calculating the final PAD and the final CRC on the basis of the transfer completion reports (S220). Thereafter, the MP 240 writes the final PAD and the final CRC to the intermediate buffer 530 (S230), and transmits a data transfer start instruction instructing transfer of the response data to the host computer 400 to the host channel control LSI 510 (S240).

The host channel control LSI 510 that has received the data transfer start instruction reads T(0), T(1), and T(2), the final PAD, and the final CRC from the intermediate buffer 530, gives an address offset in units of bytes, and thereby, concatenates T(0), T(1), T(2), the final PAD, and the final CRC to store resultant concatenated data as the response data in the internal buffer 512 (S250). Thereafter, the host channel control LSI 510 transmits the response data to the host computer 400 (S260). When transfer of the response data is completed, the host channel control LSI 510 transmits a status response to the multi-track read request to the host computer 400 (S270).

An example of the multi-track read processing has been described above. By this processing, the MP 240 allocates the plurality of tracks as read targets to the plurality of DMA controllers 521, respectively, and thus, the plurality of DMA controllers 521 may perform a plurality of DMA processing in parallel. Also, the MP 240 performs an operation on the basis of processing results of the plurality of DMA controllers 521, and thus, a CRC of data concatenated in the order of the plurality of tracks may be calculated.

Note that only one of the intermediate buffer 530 and the internal buffer 512 may be used. For example, the DMA controllers 521 may transfer data in the data cache 230 to the internal buffer 512. The communication control unit 511 may transfer data in the intermediate buffer 530 to the host computer 400.

Details of the DMA processing in the foregoing S130 to S210 will be hereinafter described.

Figure 5:
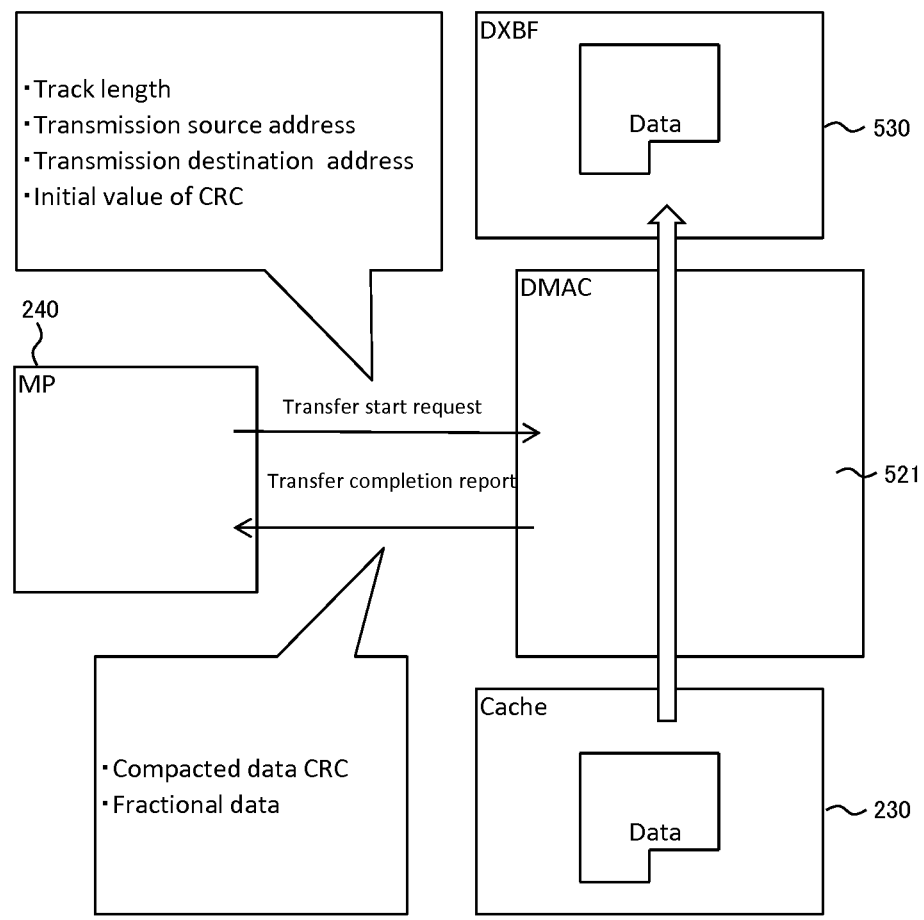
FIG. 5 is a diagram illustrating DMA processing.

FIG. 5 is a diagram illustrating DMA processing.

A transfer start request includes a track length (a transfer length), a transmission source address that is an address of a track in the data cache 230, a transmission source address that is an address of a transmission source in the intermediate buffer 530, and an initial value of the CRC. The transfer start request may include information indicating whether or not generation of a CRC of the track is to be performed.

The MP 240 specifies 0xFFFFFFFF as an initial value of a CRC in a transfer start request for an initial track of the multi-track read request and 0x00000000 as an initial value of a CRC in a transfer start request for the other tracks. In this example, an initial value of a CRC in the transfer start request to X(0) is 0xFFFFFFFF, and an initial value of a CRC in the transfer start request to each of X(1) and X(2) is 0x00000000. Thus, a predetermined value is specified as the initial value of each of the CRCs, and therefore, the transfer start request issued to each of the DMA controllers 521 does not have to contain results of the CRC operations performed by the other DMA controllers 521.

The DMA controller 521 obtains the track length from the transfer start request, calculates a residue as a fractional data length by dividing the track length by 4 bytes, a value as a track PAD length by subtracting the fractional data length from 4 bytes, a value as a compacted data length by subtracting the fractional data length from the track length, and a value as an extended data length by adding the track PDA length to the track length. The DMA controller 521 extracts, as the compacted data, data from a head to the compacted data length in a track and, as fractional data, data following the compacted data and having the fractional data length in the track. The DMA controller 521 further joins the track PAD, that is, all-zero data having the track PAD length, after the track to generate extended data. In other words, the compacted data length is a largest one of multiples of 4 bytes which are equal to or smaller than the track length, and the extended data length is a smallest one of multiples of 4 bytes which are equal to or larger than the track length. Note that, when the track length is a multiple of 4, each of the fractional data length and the track PAD length is 0, and each of the compacted data length and the extended data length is equal to the track length.

The DMA controller 521 reads a track from the transmission source address of the data cache 230, calculates a compacted data CRC that is a CRC of the compacted data, and writes the extended data to the transmission source address of the intermediate buffer 530.

When writing of the extended data is completed, the DMA controller 521 transmits a transfer completion report regarding the transfer start request to the MP 240. The transfer completion report includes the compacted data CRC and the fractional data.

In the above-described example of multi-track read request processing, X(0) divides T(0) into T(0)_t, which is the compacted data, and T(0)_dat, which is the fractional data, and calculates T(0)_crc, which is the compacted data CRC, using 0xFFFFFFFF as the initial value and the input T(0)_t as an input. Also, X(1) divides T(1) into T(1)_t, which is the compacted data, and T(1)_dat, which is the fractional data, and calculates T(1)_crc, which is the compacted data CRC, using 0x00000000 as the initial value and T(1)_t as an input. Furthermore, X(2) divides T(2) into T(2)_t, which is the compacted data, and T(2)_dat, which is the fractional data, and calculates T(2)_crc, which is the compacted data CRC, using 0x00000000 as the initial value and T(2)_t as an input.

The DMA processing has been described above. By this processing, each of the DMA controllers 521 uses, as the initial value of the CRC, a value specified by a corresponding one of the MPs 240, and therefore, does not have to take over the CRC calculated by another of the DMA controllers 521. Thus, the plurality of DMA controllers 521 may perform the CRC operations in parallel. Also, since the DMA controller 521 transmits the fractional data of smaller than 4 bytes to the MP 240 and do not perform the CRC operation for the fractional data, the DMA circuit that performs the CRC operation in units of 4 bytes may be used. Thus, increase in circuit size of the DMA controller 521 may be reduced.

Details of the final CRC processing in the foregoing S220 will be hereinafter described.

Figure 6:
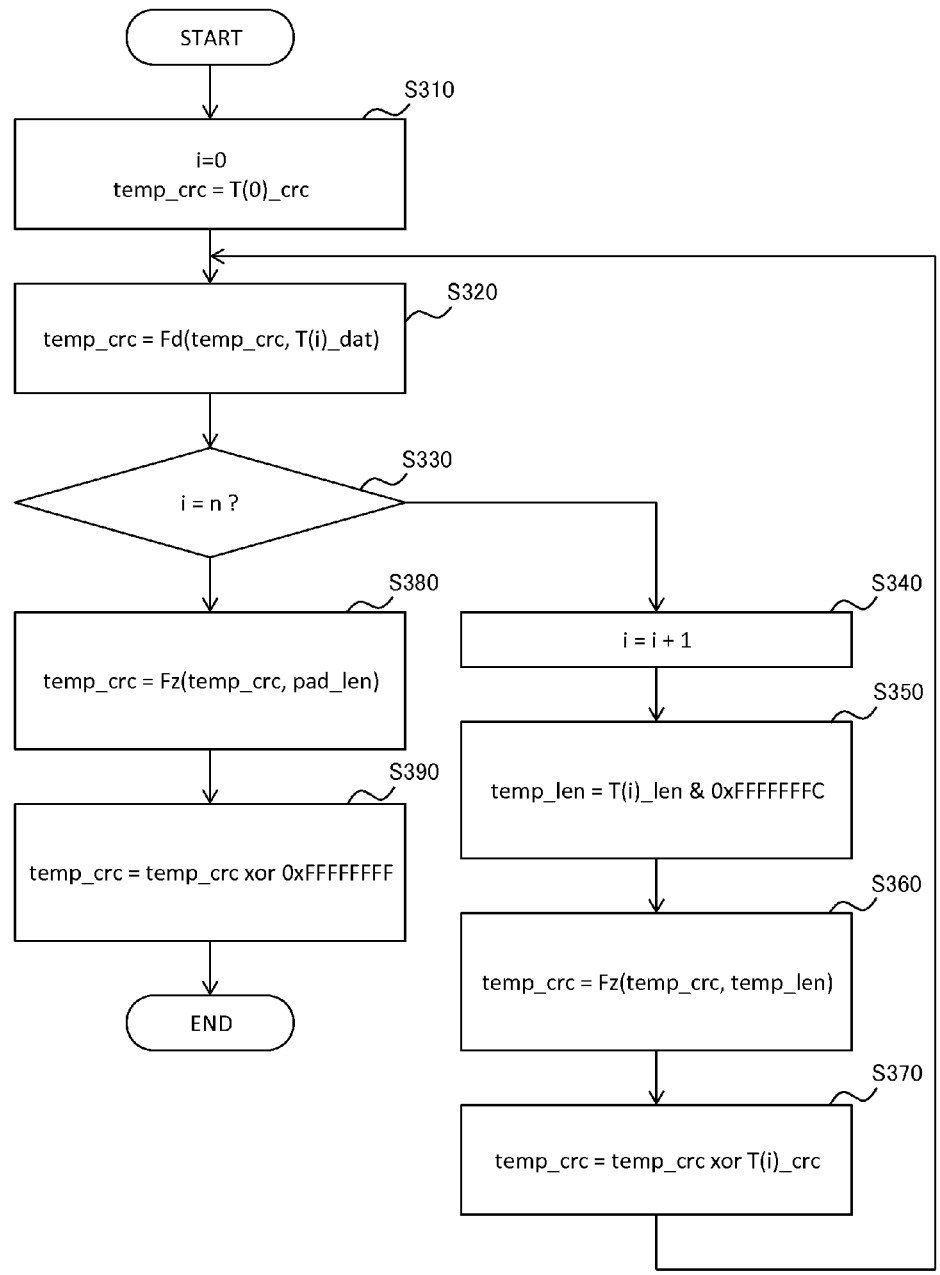
FIG. 6 is a flowchart of final CRC processing.

FIG. 6 is a flowchart of the final CRC processing. In this case, a track number is denoted by i, a final track number is denoted by n, compacted data CRC of T(i) is denoted by T(i)_crc, fractional data of T(i) is denoted by T(i)_dat, a length [byte] of T(i) is denoted by T(i)_len, a temporary CRC is denoted by temp_crc, a temporary data length is denoted by temp_len, and a length [byte] of the final PAD is denoted by pad_len. The MP 240 obtains T(i)_crc and T(i)_dat from the transfer completion report from the DMA controller 521.

First, the MP 240 initializes a variant (S310). In this case, the MP 240 assigns 0 to i, and T(0)_crc to temp_crc.

Thereafter, the MP 240 performs the CRC operation using temp_crc as an initial value and T(i)_dat as an input, thereby calculating new temp_crc (S320). Assuming that a function of the CRC operation is Fd, this processing is represented by an expression below.

temp_crc=*Fd*(temp_crc,*T*(*i*)_dat)

By the foregoing processing, temp_crc is caused to be a CRC of data up to T(i).

Thereafter, the MP 240 determines whether or not the CRC operation has been performed on tracks through to the final track (S330). That is, the MP 240 determines whether or not i=n.

If i=n is not satisfied in S330 (S330: N), the MP 240 adds 1 to i (S340). Thereafter, the MP 240 assigns a value which is a maximum multiple of 4 and does not exceed T(i)_len to temp_len (S350). This processing is represented by an expression below.

temp_len=*T*(*i*)_len & 0x*FFFFFFFC*

Thereafter, the MP 240 performs the CRC operation using temp_crc as an initial value and all-zero data with the length of temp_len as an input, thereby calculating new temp_crc (S360). Assuming that a function used for calculating a CRC using a certain initial value and all-zero data with a certain length is Fz, this processing is represented by an expression below.

temp_crc=*Fz*(temp_crc,temp_len)

Thereafter, the MP 240 performs an exclusive OR (XOR) operation of temp_crc and T(i)_crc in units of bits to calculate new temp_crc (S370), and then, the process proceeds to S320. Assuming that an XOR operator is "xor," this processing is represented by an expression below.

temp_crc=temp_crc xor *T*(*i*)_crc

By the foregoing processing, temp_crc is caused to be a CRC of data up to T(i)_t.

If i=n is satisfied in S330 (S330:Y), the MP 240 performs the CRC operation using temp_crc as an initial value and all-zero data with a length of pad_len as an input, thereby calculating new temp_crc (S380). Using the above-described Fz, this processing is represented by an expression below.

temp_crc=*Fz*(temp_crc,pad_len)

By the foregoing processing, temp_crc is caused to be the CRC of the formatted data.

Thereafter, the MP 240 performs bit inversion of temp_crc in accordance with a specification of FICON-HPF to calculate the final CRC (S390), and then, ends this flow. Using the above-described xor, this processing is represented by an expression below.

temp_crc=temp_crc xor 0x*FFFFFFFF*

The CRC operation processing performed by the MP 240 has been described above. By performing this processing, the MP 240 may calculate the final CRC of the formatted data on the basis of the compacted data CRC of each track calculated by the DMA controller 521. Also, since the MP 240 calculates a CRC of the fractional data, the track length may be specified in units of bytes, and the DMA controller 521 may perform the CRC operation in units of 4 bytes. Thus, increase in circuit size of the DMA controller 521 may be reduced.

Also, when the DMA controller 521 has calculated a first CRC from specific data in the concatenated data, the MP 240 uses, as an initial value, a CRC of data preceding the specific data in the concatenated data, calculates a second CRC from all-zero data with a specific data length, and performs an XOR operation of the first CRC and the second CRC, thereby calculating a CRC of data up to the specific data in the concatenated data. Thus, the MP 240 may calculate, using results of the CRC operation for a plurality of pieces of data by the plurality of DMA controllers 521, CRCs of the concatenated plurality of pieces of data. Accordingly, a result of the CRC operation obtained by one of the DMA controllers 521 does not have to be taken over by another of the DMA controllers 521.

Also, the MP 240 obtains the fractional data from the DMA controller 521 and performs the CRC operation for the fractional data, and thus, the DMA controller 521 may perform the CRC operation in units of 4 bytes.

Note that the MP 240 may specify an initial value of a CRC in all DMA processing to be 0x00000000 and, as another alternative, may fix an initial value of a CRC in all DMA processing to 0x00000000. In this case, the MP 240 may calculate a CRC using 0xFFFFFFFF as an initial value of the CRC in the final CRC processing and all-zero data with a compacted data length of a first track as an input and perform an XOR operation of the CRC and the compacted data CRC, thereby obtaining a result equivalent to the compacted data CRC calculated with 0xFFFFFFFF set as the initial value.

A specific example of the CRC final processing will be hereinafter described.

In the response data of FIG. 3, it is assumed that a data length of T(0) is 67 bytes, a data length of T(1) is 18 bytes, and a data length of T(2) is 33 bytes. Accordingly, the concatenated data length is 118 bytes, the final PAD length is 2 bytes, the formatted data length is 120 bytes that is a multiple of 4 bytes.

X(0) divides T(0) of 67 bytes into T(0)_t of 64 bytes, which is a multiple of 4 bytes, and T(0)_dat of remaining 3 bytes. Thereafter, X(0) performs the CRC operation using 0xFFFFFFFF as an initial value and T(0)_t as an input, thereby calculating T(0)_crc.

X(1) divides T(1) of 18 bytes into T(1)_t of 16 bytes, which is a multiple of 4 bytes, and T(1)_dat of remaining 2 bytes. Thereafter, X(1) performs the CRC operation using 0x00000000 as an initial value and T(1)_t as an input, thereby calculating T(1)_crc.

X(2) divides T(2) of 33 bytes into T(2)_t of 32 bytes, which is a multiple of 4 bytes, and T(2)_dat of remaining 1 byte. Thereafter, X(2) performs the CRC operation using 0x00000000 as an initial value and T(2)_t as an input, thereby calculating T(2)_crc.

Figure 7:
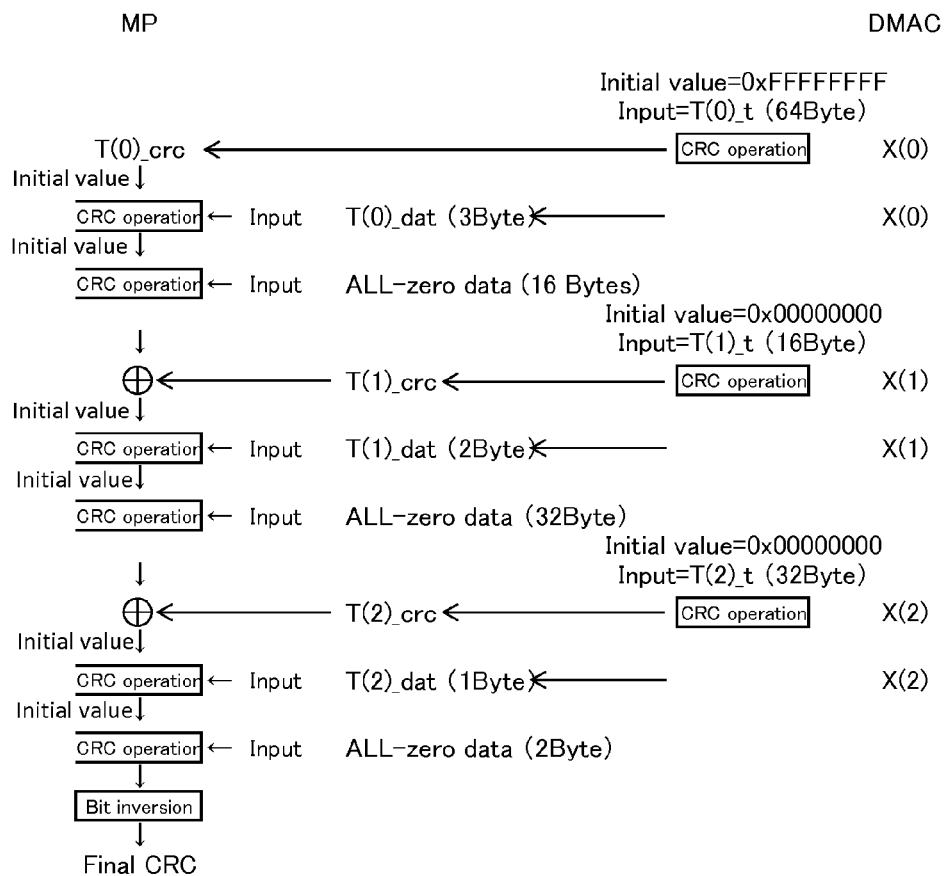
FIG. 7 is a diagram illustrating a specific example of CRC final processing.

FIG. 7 is a diagram illustrating a specific example of the CRC final processing. The MP 240 performs the CRC operation using T(0)_crc obtained from X(0) as an initial value and T(0)_dat obtained from X(0) as an input, thereby calculating new temp_crc. The new temp_crc is a CRC of data up to T(0).

Thereafter, the MP 240 performs the CRC operation using temp_crc as an initial value and all-zero data of 16 bytes equivalent to a length of compacted data of T(1) as an input, thereby calculating new temp_crc. Thereafter, the MP 240 performs an XOR operation of temp_crc and T(1)_crc obtained from X(1), thereby calculating new temp_crc. Thereafter, the MP 240 performs the CRC operation using temp_crc as an initial value and T(1)_dat obtained from X(1) as an input, thereby calculating new temp_crc. The new temp_crc is a CRC of data up to T(1).

Thereafter, the MP 240 performs the CRC operation using temp_crc as an initial value and all-zero data of 32 bytes equivalent to a length of compacted data of T(2) as an input, thereby calculating new temp_crc. Thereafter, the MP 240 performs an XOR operation of temp_crc and T(2)_crc obtained from X(2), thereby calculating new temp_crc. Thereafter, the MP 240 performs the CRC operation using temp_crc as an initial value and T(2)_dat obtained from X(2) as an input, thereby calculating new temp_crc. The new temp_crc is a CRC of data up to T(2).

Thereafter, the MP 240 performs the CRC operation using temp_crc as an initial value and all-zero data of 2 bytes, which is the final PAD length, as an input, thereby calculating new temp_crc. The new temp_crc is a CRC of data up to the final PAD.

Thereafter, the MP 240 performs bit inversion of temp_crc, thereby calculating the final CRC.

A specific example of the CRC final processing has been described above.

An example method for operating Fz in the foregoing S360 and S380 will be hereinafter described.

In order to increase a speed of the CRC operation for all-zero data, the shared memory stores a plurality of lookup tables (LUTs). The MP 240 refers to the LUTs in accordance with an initial value of a CRC and an all-zero data length of an input, thereby performing an operation of Fz. An operation method and a size and a number of LUTs are determined by a required performance of the storage apparatus 100, an assumed all-zero data length, a size of the shared memory, and the like.

In this case, the initial value is 1 byte, and the value is represented by Bi. Each of the plurality of LUTs stores CRCs for all Bis. Also, the all-zero data length in the LUTs to be prepared is limited to a specific length. Assuming that the specific length is Lt, Lt is, for example, 1, 2, 3, 4, 16, 256, or 4096. In order to increase a speed of the operation, an increased number of types of Lts may be prepared.

When Lt is smaller than 4, an LUT is prepared for each Lt. A CRC obtained from the LUT is represented by LUT[Lt][Bi].

When Lt is equal to or larger than 4, a byte position of Bi in a 4-byte initial value is represented by Pb, and an LUT for each combination of Lt and Pb is prepared. The CRC obtained from the LUT is represented by LUT[Lt][Pb][Bi].

The MP 240 decomposes the all-zero data length to combinations of Lts, and the CRC operation corresponding to each of decomposed Lts, thereby performing the operation of Fz. LUT operation processing that is the CRC operation for the all-zero data in accordance with Lt will be hereinafter described. In this case, bytes of temp_crc, that is, a 4 byte initial value, are represented by B0, B1, B2, and B3, and an operation of a left bit shift is represented by "<<."

The LUT operation processing used when Lt is 1 byte is represented by an expression below.

temp_crc=LUT[1][*B*0]XOR(*B*1<<8)XOR(*B*2<<16) XOR(*B*3<<24)

The LUT operation processing used when Lt is 2 bytes is represented by an expression below.

temp_crc=LUT[2][*B*0]XOR LUT[1][*B*1]XOR (*B*2<<16)XOR(*B*3<<24)

The LUT operation processing used when Lt is 3 bytes is represented by an expression below.

temp_crc=LUT[3][*B*0]XOR LUT[2][*B*1]XOR LUT [1][*B*2]XOR(*B*3<<24)

The LUT operation processing used when Lt is equal to or larger than 4 bytes is represented by an expression below.

temp_crc=LUT[*Lt*][0][*B*0]XOR LUT[*Lt*][1][*B*1]XOR LUT[*Lt*][2][*B*2]XOR LUT[*Lt*][3][*B*3]

For example, when the all-zero data length is 8458 bytes, the MP 240 decomposes the all-zero data length to Lts of 4096+4096+256+4+4+2, and performs the LUT operation processing corresponding to each Lt.

Using the above-described operation method, the speed of the CRC operation for the all-zero data by the MP 240 is increased. Also, by decomposing the all-zero data length to a combination of specific lengths, and thus, a number of LUTs may be reduced.

Note that the MP 240 may be configured to calculate the CRC of the fractional data using an LUT. For example, the LUT uses 0x00000000 as an initial value, and stores a CRC operation result for each data of an input of 1 byte. In this case, the MP 240 performs bit shift on the CRC obtained from the LUT in accordance with the fractional data length, and an XOR operation of the bit shifted CRC and a CRC preceding the CRC.

A parallel operation of the DMA controllers 521 will be hereinafter described.

Figure 8:
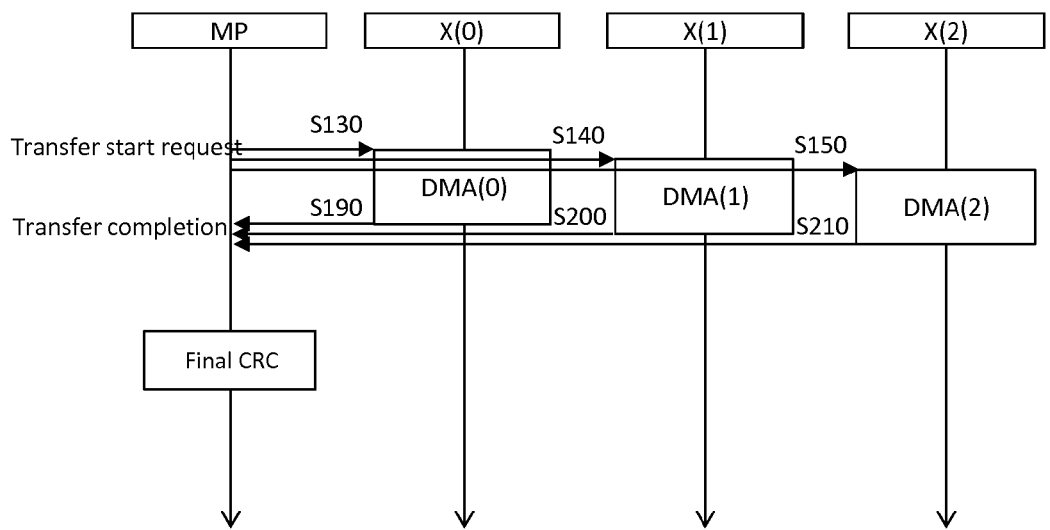
FIG. 8 is a diagram illustrating operations of DMA controllers and MP 240 regarding a CRC operation.

FIG. 8 is a diagram illustrating operations of the DMA controllers 521 and MP 240 regarding the CRC operation.

The sequence diagram illustrates operations of the MP240 and X(0), X(1), and X(2), which are the DMA controllers 521. In the foregoing S130, S140, and S150, the MP 240 transfers a transfer start request to each of X(0), X(1), and X(2). Then, X(0), X(1), and X(2) which have received the transfer start requests start DMA(0), DMA(1), and DMA(2), respectively. Thus, X(0), X(1), and X(2) perform DMA processing in parallel. Thereafter, in the foregoing S190, S200, and S210, each of X(0), X(1), and X(2) that have completed data transfer transmits a transfer completion report including the CRC operation result to the MP 240. Thereafter, in the foregoing S220, the MP 240 sequentially uses the CRC operation results transmitted from X(0), X(1), and X(2) to perform the final CRC processing, thereby calculating the final CRC.

On the other hand, in a storage apparatus to which the present invention is not applied, when one of the DMA controllers takes over a result of a CRC operation performed by another of the DMA controllers and performs the CRC operation, the DMA controllers cannot perform the CRC operations in parallel.

According to this embodiment, however, the plurality of DMA controllers 521 performs the CRC operations on a plurality of tracks in parallel, and thus, transfer of the plurality of tracks may be performed in parallel. Therefore, a performance of the multi-track read processing may be improved.

Note that a length of each track may be a multiple of 4 bytes. In this case, the MP 240 and the DMA controllers 521 do not use the fractional data, the track PAD, the final PAD, and the like.

The technology described in the above-described embodiment may be described as follows.

(Description 1)

A storage apparatus comprising:
a channel control unit coupled to a host computer;
a storage device coupled to the channel control unit; and
a processor coupled to the channel control unit and the storage device,
wherein the channel control unit includes a plurality of operation units,
the processor specifies, when receiving a request for read of a plurality of pieces of element data from the host computer, the plurality of pieces of element data to the plurality of operation units, respectively,
the plurality of operation units respectively reads the plurality of pieces of element data from the storage device, calculates a plurality of partial codes that is a plurality of guarantee codes on the basis of the plurality of pieces of element data, and transmits the plurality of partial codes to the processor, and
the processor calculates, on the basis of the plurality of partial codes, a sequence code that is a guarantee code of sequence data including the plurality of pieces of element data which is concatenated.

(Description 2)

The storage apparatus of description 1, wherein the plurality of operation units calculates the plurality of partial codes in parallel, respectively.

(Description 3)

The storage apparatus of description 2, wherein the guarantee code is a CRC having a predetermined length.

(Description 4)

The storage apparatus of description 3, wherein each of the plurality of operation units extracts partial data that is data having a length of a multiple of the predetermined length, from element data specified by the processor, and calculates the partial code by performing a guarantee code operation using a predetermined code as an initial value of a partial code and the partial data as an input.

(Description 5)

The storage apparatus of description 4, wherein the processor calculates a temporary guarantee code by performing a guarantee code operation using a guarantee code of data preceding the partial data in the sequence data as an initial value of a guarantee code and zero with a length equal to the partial data as an input, and calculates a guarantee code of data up to the partial data in the sequence data by performing an XOR operation of the temporary guarantee code and the partial code.

(Description 6)

The storage apparatus of description 5, wherein when there is fractional data that is remaining data of the partial data in the specified element data, each of the plurality of operation units transmits the fractional data to the processor.

(Description 7)

The storage apparatus of description 6, wherein the processor calculates a guarantee code of data up to the fractional data in the sequence data by performing a guarantee code operation using a guarantee code of data preceding the fractional data in the sequence data as an initial value of a guarantee code and the fractional data as an input.

(Description 8)

The storage apparatus of description 7, wherein the processor transmits the predetermined code to each of the plurality of operation units.

(Description 9)

The storage apparatus of description 8, wherein a predetermined code corresponding to one of the operation units for which element data other than first element data in the plurality of pieces of element data is specified has the predetermined length of zero.

(Description 10)

The storage apparatus of description 9, wherein the channel control unit further includes a buffer coupled to the plurality of operation units, and a communication control unit coupled to the buffer,
the plurality of operation units writes the plurality of pieces of element data to the buffer, respectively,
the processor writes the sequence code to the buffer, and
the communication control unit concatenates the sequence data in the buffer and the sequence code and transmits the concatenated data to the host computer.

(Description 11)

A storage apparatus control method used for controlling a storage apparatus including a channel control unit coupled to a host computer, a storage device coupled to the channel control unit, and a processor coupled to the channel control unit and the storage device, the channel control unit including a plurality of operation units, the method comprising:
a step in which the processor specifies, when receiving a request for read of a plurality of pieces of element data from the host computer, the plurality of pieces of element data to the plurality of operation units, respectively;
a step in which the plurality of operation units respectively reads the plurality of pieces of element data from the storage device, calculates a plurality of partial codes that is a plurality of guarantee codes on the basis of the plurality of pieces of element data, and transmits the plurality of partial codes to the processor; and
a step in which the processor calculates, on the basis of the plurality of partial codes, a sequence code that is a guarantee code of sequence data including the plurality of pieces of element data which is concatenated.

Terms used in the above-described descriptions will be explained. The channel control unit corresponds to the channel adapters 220, and the like. The storage device corresponds to the data caches 230, the HDDs 300, and the like. The processor corresponds to the MPs 240, and the like. The operation unit corresponds to the DMA controllers 521, and the like. The buffer corresponds to the intermediate buffers 530, the internal buffer 512, and the like. The communication control unit corresponds to the communication control unit 511, and the like. The element data corresponds to the track, and the like. The partial data corresponds to the compacted data, and the like. The partial code corresponds to the compacted data CRC, and the like. The sequence data corresponds to the formatted data, the concatenated data, and the like. The sequence code corresponds to the final CRC, and the like. The predetermined code corresponds to 0xFFFFFFFF, 0x00000000, and the like.

REFERENCE SIGNS LIST

100 Storage apparatus
200 Storage controller

210 Switch
220 Channel adapter
230 Data cache
250 Disk adapter
400 Host computer
510 Host channel control LSI
511 Communication control unit
512 Internal buffer
520 For-DMA LSI
521 DMA controller
530 Intermediate buffer

The invention claimed is:

1. A storage apparatus comprising:
a switch;
a plurality of channel adapters communicatively coupled to the switch, wherein each of the plurality of channel adapters includes a plurality of direct memory access controllers (DMACs)
a plurality of data caches communicatively coupled to the switch;
one or more disk adapters communicatively coupled to the switch, wherein each of the one or more disk adapters is communicatively coupled to one or more hard disk drives; and
one or more processors communicatively coupled to the switch;
wherein each of the one or more processors:
receives, via a particular channel adapter from the plurality of channel adapters, a request to read a plurality of pieces of element data from a host computer communicatively coupled to the particular channel adapter, and
transmits a start request to the plurality of DMACs of the particular channel adapter, wherein the start request identifies the plurality of pieces of element data;
wherein the plurality of DMACs:
receives the start request from a particular processor,
reads the plurality of pieces of element data in parallel, wherein different DMACs read different pieces of element data,
calculates a cyclic redundancy check (CRC) for each of the plurality of pieces of element data,
concatenates the CRC calculated for each of the plurality of pieces of element data to the respective piece of element data to form a plurality of partial codes; and
transmits the plurality of partial codes to the particular processor, and
wherein the particular processor:
calculates a sequence code that is a guarantee code of the plurality of partial codes and the CRC calculated for each of the plurality of pieces of element data, and
concatenates the sequence code and the plurality of partial codes to form response data.

2. The storage apparatus according to claim 1, wherein the guarantee code is a CRC having a predetermined length.

3. The storage apparatus according to claim 1, wherein each of the plurality of DMACs:
extracts partial data that is data having a length of a multiple of a predetermined length from the plurality of pieces of element data, and
calculates the CRC by performing a guarantee code operation using a predetermined code as an initial value of the CRC and the partial data as an input.

4. The storage apparatus according to claim 3, wherein the particular processor further:
calculates a temporary guarantee code by performing the guarantee code operation using a proceeding guarantee code as an initial value of the guarantee code and zero with a length equal to the partial data as an input, and calculates the guarantee code up to the partial data in the plurality of partial codes by performing an XOR operation of the temporary guarantee code and the partial code.

5. The storage apparatus according to claim 4, wherein when there is fractional data that is remaining data of the partial data from the plurality of pieces of element data, and
wherein each of the DMACs transmits the fractional data to the particular processor.

6. The storage apparatus according to claim 1, wherein each of the plurality of DMACs:
extracts partial data that is data having a length of a multiple of a predetermined length from the plurality of pieces of element data; and
wherein the particular processor further:
calculates the guarantee code of data by performing a guarantee code operation using a preceding guarantee code as an initial value of the guarantee code and the partial data as an input, wherein the preceding guarantee code is determined based on partial data in the sequence preceding the data used as the input.

7. The storage apparatus according to claim 6, wherein the start request further includes a predetermined CRC code.

8. The storage apparatus according to claim 1, wherein each respective channel adaptive from the plurality of channel adapters further includes a buffer coupled to the respective channel adapter, and a communication control unit communicatively coupled to the buffer;
wherein each of the plurality of DMACS writes the plurality of pieces of element data to the buffer of the respective channel adapter,
wherein the particular processor further writes the sequence code to the buffer of the respective channel adapter, and
the communication control unit transmits the response data to the host computer.

9. A storage apparatus control method, the method comprising:
receiving, by a processor, a request for read of a plurality of pieces of element data from a host computer, wherein the request is received via a particular channel adapter from a plurality of channels adapters;
transmitting, by the processor, a start request to the particular channel adapter, wherein the start request identifies the plurality of pieces of element data and wherein the particular channel adapter includes a plurality of direct memory access controllers (DMACs);
receiving, by the plurality of DMACs, the start request, wherein the start request identifies the plurality of pieces of element data;
reading, by the plurality of DMACs, the plurality of pieces of element data in parallel, wherein different DMACs read different pieces of element data;
calculating, by the plurality of DMACs, a cyclic redundancy check (CRC) for each of the pieces of element data;
concatenating, by the plurality of DMACs, the CRC calculated for each of the plurality of pieces of element data to a respective piece of element data to form a plurality of partial codes:
transmitting, by the plurality of DMACs the plurality of partial codes to the processor;

calculating, by the processor, a sequence code that is a guarantee code of the plurality of partial codes and the CRC calculated for each of the plurality of pieces of element data; and concatenating, by the processor, the sequence code and the plurality of partial codes to form response data.

\* \* \* \* \*